United States Patent
Ishikawa et al.

(10) Patent No.: US 8,244,450 B2
(45) Date of Patent: Aug. 14, 2012

(54) VEHICLE POSITION INFORMATION PROVIDING DEVICES, METHODS, AND PROGRAMS

(75) Inventors: Hiroki Ishikawa, Anjo (JP); Yukio Yamamoto, Anjo (JP); Toshihiro Kano, Nagakute (JP)

(73) Assignee: Aisin AW Co., Ltd., Anjo (JP)

( * ) Notice: Subject to any disclaimer, the term of this patent is extended or adjusted under 35 U.S.C. 154(b) by 765 days.

(21) Appl. No.: 12/149,082

(22) Filed: Apr. 25, 2008

(65) Prior Publication Data

US 2008/0270013 A1 Oct. 30, 2008

(30) Foreign Application Priority Data

Apr. 26, 2007 (JP) .................................. 2007-117021

(51) Int. Cl.
*G01C 21/36* (2006.01)

(52) U.S. Cl. ........ 701/117; 701/468; 701/495; 707/705; 455/456.2; 342/357.25

(58) Field of Classification Search ................. 701/117, 701/468, 495; 707/705; 455/456.2; 348/231.5; 342/357.25, 357.34; G01C 21/36
See application file for complete search history.

(56) References Cited

U.S. PATENT DOCUMENTS

| | | | |
|---|---|---|---|
| 6,188,351 B1 * | 2/2001 | Bloebaum | 342/357.42 |
| 6,202,024 B1 * | 3/2001 | Yokoyama et al. | 701/420 |
| 6,452,544 B1 | 9/2002 | Hakala et al. | |
| 6,970,783 B2 * | 11/2005 | Knockeart et al. | 701/469 |
| 7,298,321 B2 * | 11/2007 | King et al. | 342/357.43 |
| 7,308,272 B1 * | 12/2007 | Wortham | 455/456.1 |
| 7,372,839 B2 * | 5/2008 | Relan et al. | 370/338 |
| 7,565,241 B2 * | 7/2009 | Tauchi | 701/208 |
| 7,660,590 B2 * | 2/2010 | Timiri et al. | 455/456.3 |
| 7,783,423 B2 * | 8/2010 | Verma et al. | 701/469 |
| 7,848,645 B2 * | 12/2010 | Healey et al. | 398/16 |
| 7,929,979 B2 * | 4/2011 | Konno | 455/456.4 |
| 8,046,474 B2 * | 10/2011 | Kato et al. | 709/228 |
| 2002/0040271 A1 * | 4/2002 | Park et al. | 701/209 |
| 2003/0236607 A1 * | 12/2003 | Tanaka et al. | 701/70 |
| 2006/0106622 A1 * | 5/2006 | Lee | 705/1 |
| 2006/0111837 A1 * | 5/2006 | Tauchi | 701/210 |

(Continued)

FOREIGN PATENT DOCUMENTS

JP 2002290315 A * 10/2002

(Continued)

OTHER PUBLICATIONS

Chakrabarti, S., Mishra, A, "A network architecture for global wireless position location services", vol. 3 Publication Year: 1999, pp. 1779-1783 vol. 3.*

(Continued)

*Primary Examiner* — Tuan C. To
(74) *Attorney, Agent, or Firm* — Oliff & Berridge, PLC

(57) ABSTRACT

Vehicle position information providing devices, methods, and programs acquire a first current position of a vehicle based on a radio signal received from a GPS satellite and acquire a second current position of the vehicle based on a signal received by a communication device that communicates over a mobile phone network. The devices, methods, and programs determine whether the first current position and the second current position coincide. If the first current position and the second current position do not coincide, the devices, methods, and programs cause the communication device to transmit information relating to the first current position to an information center.

9 Claims, 5 Drawing Sheets

U.S. PATENT DOCUMENTS

| | | |
|---|---|---|
| 2007/0038360 A1 | 2/2007 | Sakhpara |
| 2007/0150192 A1* | 6/2007 | Wakamatsu et al. .......... 701/213 |
| 2007/0159387 A1* | 7/2007 | Syrjarinne et al. ....... 342/357.09 |
| 2007/0207772 A1* | 9/2007 | Huber et al. ............... 455/404.2 |

FOREIGN PATENT DOCUMENTS

| | | | |
|---|---|---|---|
| JP | A 2004-234649 | | 8/2004 |
| JP | 2005018637 A | * | 1/2005 |
| JP | 2005274293 A | * | 10/2005 |
| WO | WO 2005/010549 A2 | | 2/2005 |

OTHER PUBLICATIONS

Sung-Shik Woo, Heung-Ryeol You, Tae-Geun Kim, "The position location system using IS-95 CDMA networks", Publication Year: 2000, pp. 20-24.*

Dec. 12, 2009 European Search Report issued in EP 08 00 8045.

\* cited by examiner

VEHICLE POSITION INFORMATION PROVIDING DEVICES, METHODS, AND PROGRAMS

INCORPORATION BY REFERENCE

The disclosure of Japanese Patent Application No. 2007-117021, filed on Apr. 26, 2007, including the specification, drawings and abstract is incorporated herein by reference in its entirety.

BACKGROUND

1. Related Technical Fields

The present invention relates to devices, methods, and programs that provide information on a current position of a vehicle to an information center.

2. Related Art

On-vehicle navigation devices, personal digital assistants (PDAs), mobile information devices such as a mobile phone, personal computers, and the like, are capable of displaying a map of a desired area to a user. The maps are displayed by storing information on roads such as a general road and an expressway, facility names, and the like as map information in various storage devices, downloading the map information from a server, and/or the like.

Traffic information such as traffic jam information of a displayed road may also be provided in order to improve the user's convenience. As a new system of acquiring the traffic information, a probe car system, in which a running vehicle acts as a sensor (probe) to gather probe information in a probe center and thereby produce the traffic information, is currently under research. The probe information may include a current position, travel path, speed, and the like, measured by the probe vehicle. For example, Japanese Patent Application Publication No. JP-A-2004-234649 (e.g., page 5 and FIG. 2) discloses a system that accumulates probe information gathered from a probe car, generates traffic information by performing a statistical process on the accumulated information, and provides the traffic information to a terminal such as a navigation device or a PC.

Also, in the related art, a vehicle position can be specified using a mobile phone installed in a vehicle. Specifically, the current position of the mobile phone in a mobile phone communication network can be identified by a known enhanced observed time difference (E-OTD) method, a time difference of arrival (TDOA) method, a cell-ID method, and/or the like. The information center acquires the information via the mobile phone communication network, whereby the position of the phone (an thus the vehicle) can be specified on the information center side without performing communication with the vehicle.

SUMMARY

Generally, when transmitting information relating to the current position of a vehicle and the like to an information center from the vehicle, the transmission is performed via a communication terminal such as a mobile phone or a PHS (Personal Handyphone System) provided in the vehicle. However, to transmit the information, the number of times that communication is required and the amount of communication data can become extremely large, thereby resulting in high communication fees. This is especially the case if the information relating to the current position and the like of the vehicle is constantly transmitted to the information center while the vehicle is running. On the other hand, the reliability of the traffic information generated in the information center decreases if only limited data is transmitted a limited number of times.

Furthermore, the accuracy of the specification of the vehicle position based on a mobile phone communication network is low. As a result, the reliability of traffic information decreases when the traffic information is generated based only on a vehicle position based on a mobile phone communication network.

Various exemplary implementations of the broad principles disclosed herein provide devices, methods, and programs that can reduce the number of times of communication and the amount of communication data in communication with an information center, thereby reducing the load of communication processing, reducing communication fees, and maintaining the accuracy of the position information of the vehicle supplied to the information center from the vehicle.

Exemplary implementations provide devices, methods, and programs that acquire a first current position of a vehicle based on a radio signal received from a GPS satellite and acquire a second current position of the vehicle based on a signal received by a communication device that communicates over a mobile phone network. The devices, methods, and programs determine whether the first current position and the second current position coincide. If the first current position and the second current position do not coincide, the devices, methods, and programs cause the communication device to transmit information relating to the first current position to an information center.

BRIEF DESCRIPTION OF THE DRAWINGS

Exemplary implementations will now be described with reference to the accompanying drawings, wherein.

DETAILED DESCRIPTION OF EXAMPLES

Figure 1:
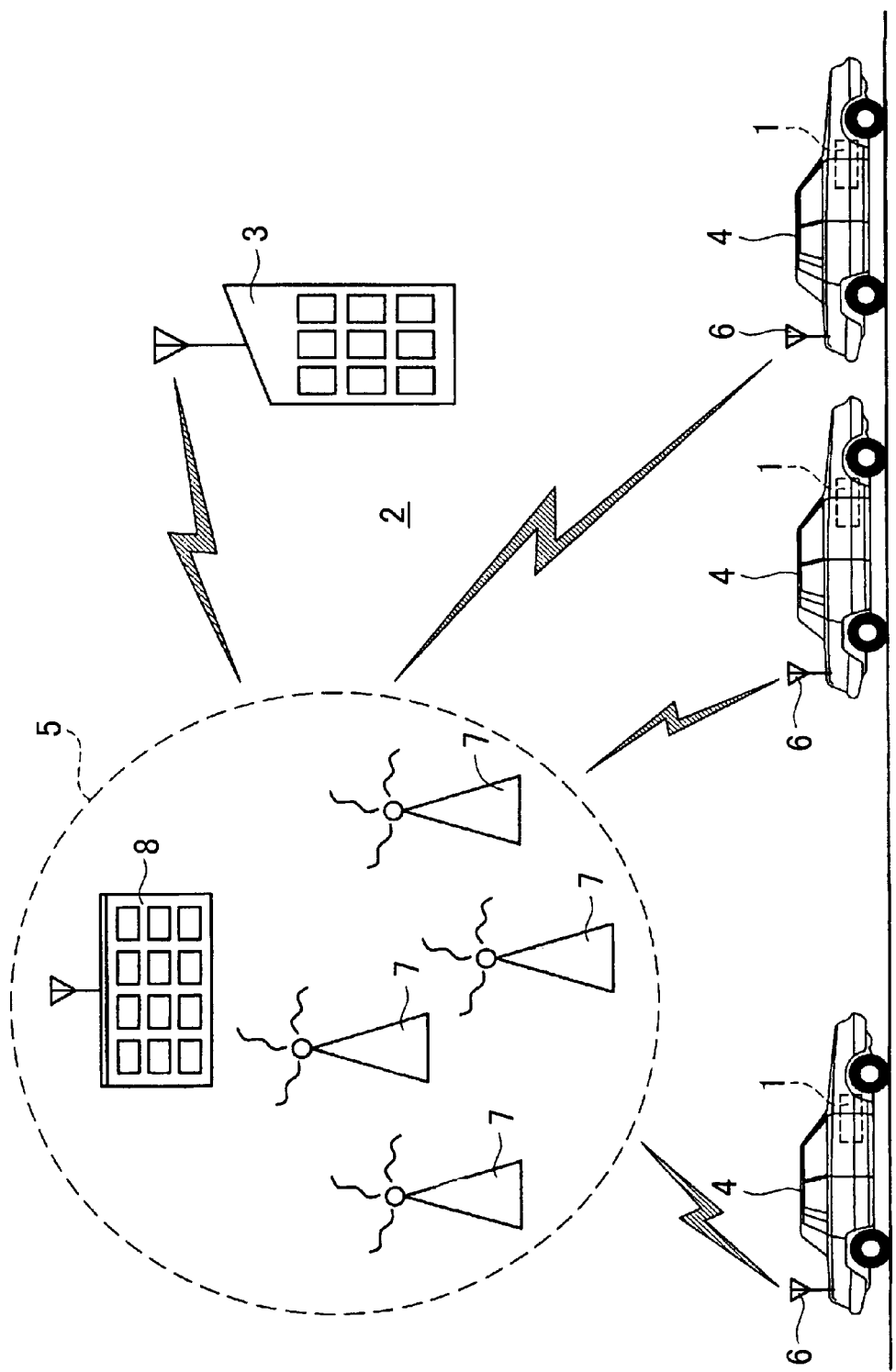
FIG. 1 is a schematic diagram showing an exemplary traffic information generation system.

An exemplary schematic configuration of a traffic information generation system 2 including a navigation device 1 will be described with reference to FIG. 1. As shown in FIG. 1, the traffic information generation system 2 according to this example is basically formed of a probe center 3 that gathers probe information and performs generation/delivery of traffic information based on the gathered probe information, a vehicle 4 as a probe car, and a mobile phone communication network 5 that links mobile phones to enable interactive communication.

The probe center 3 is a traffic information delivery center that gathers and accumulates the probe information including information relating to the current position of the vehicle 4 transmitted from each probe car 4 running in various areas of the nation, generates the traffic information such as traffic jam information from the accumulated probe information, and delivers the generated traffic information (hereinafter referred to as "probe traffic information") to the probe car 4 and/or other vehicles.

In the traffic information generation system 2 according to this example, information relating to the current position of the vehicle 4 specified by the mobile phone communication network 5 is also gathered via the mobile phone communication network 5. The probe center 3 calculates, for example, an average vehicle speed of the probe car 4 at each link based on the information relating to the current position of the probe car 4 gathered from the probe car 4 or via the mobile phone communication network 5, and generates the traffic information by performing an arithmetic operation to obtain the degree of traffic jam at the link based on the average vehicle speed of the probe car 4.

The probe car 4 is a vehicle running on each road in the nation, and forms a probe car system together with the probe center 3. The probe car system is a system that gathers information with the probe car 4 acting as a sensor. Specifically, the probe car system is a system in which the probe car 4 transmits an operational situation of each system such as speed data, steering operation, shift position, and the like together with position information of the probe car 4 detected by a global positioning system (GPS) to the probe center 3 via a mobile phone 6 as a communication module installed in the vehicle in advance, and in which the gathered data is reused as various information on the probe center 3 side.

The probe information acquired by the probe car 4 and transmitted to the probe center 3 in the traffic information generation system 2 according to this example particularly includes the information relating to the current position of the running probe car 4.

Further, the probe car 4 is provided with the navigation device 1. The navigation device 1 is on-vehicle equipment which displays a map around the position of the vehicle based on stored map data and performs search and guidance of a route to a set destination. The navigation device 1 also performs guidance based on the probe traffic information received from the probe center 3. Further, as described below, the navigation device 1 compares the current position of the probe car 4 detected by the GPS and the current position of the probe car 4 acquired via the mobile phone communication network 5 through the mobile phone 6, and performs a process of determining whether to transmit the probe information relating to the current state of the probe car 4 (specifically, information relating to the current position of the probe car 4) and transmitting the probe information to the probe center 3 based on the determination result. A detailed configuration of the navigation device 1 is described below.

The mobile phone communication network 5 includes a number of base stations 7 located in various areas of the nation and a mobile phone center 8 which manages and controls each base station 7, and is formed of a wired (optical fiber, ISDN, and the like) or wireless connection of the base stations 7 and the mobile phone center 8 with each other.

The base station 7 has a transceiver (transmitter/receiver) that communicates with the mobile phone 6 in motion, and an antenna. The base station 7 performs a communication with the mobile phone center 8, while also acting as a terminal of the mobile phone communication network 5 which serves to relay a call and communication between the mobile phones 6 within a range (cell) in which radio signals from the base station 7 can be reached, to the mobile phone communication network 5.

The mobile phone communication network 5 identifies the current position of the mobile phone 6 (and thus the position of the probe car 4) by a known enhanced observed time difference (E-OTD) method, a time difference of arrival (TDOA) method, a cell-ID method, and/or the like. For example, in the cell-ID method, a signal is received from the mobile phone 6, whereby a cell (or a sector in the case where the cell is divided into sectors) in which the mobile phone 6 exists is specified to measure the position of the probe car 4. In this case, if the mobile phone communication network 5 limits the target to on-vehicle dedicated communication instruments, the position of the mobile phone 6 can be recognized as the position of the probe car 4. Note that the mobile phone communication network 5 can constantly identify the position of the mobile phone 6 (i.e., of the probe car 4) without the expense of communication fees.

The mobile phone center 8 is also a communication management center that performs communication with the base station 7 in each area and transmits the information relating to the current position of the probe car 4 identified by the mobile phone communication network 5 to the probe center 3. Note that a data communication module (DCM) may be used as the mobile phone 6.

Figure 2:
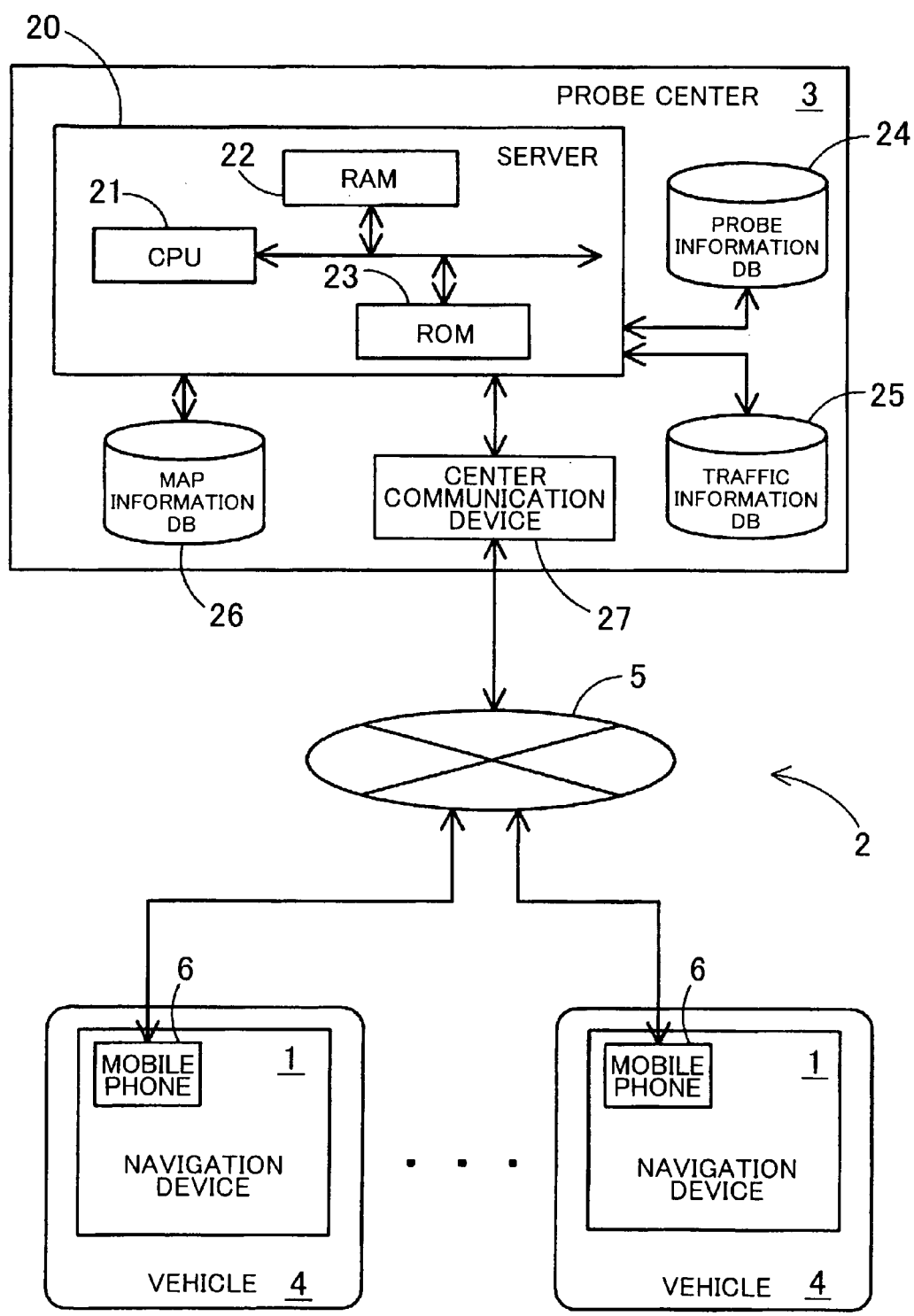
FIG. 2 is a block diagram showing the configuration of an exemplary probe center.

Next, the configuration of the probe center 3 forming the traffic information generation system 2 is described in more detail using FIG. 2. As shown in FIG. 2, the probe center 3 according to this example includes a server 20, and a probe information database (DB) 24, a traffic information DB 25, and a map information DB 26 that serve as information storage units connected to the server 20. The probe center 3 according to this example also includes a center communication device 27 connected to the server 20, as shown in FIG. 2.

The server 20 is a control section that performs various controls in the probe center 3, such as correcting the position information of the probe car 4 acquired via the mobile phone communication network 5 based on the position information of the probe car 4 acquired from the probe car 4, performing an arithmetic operation to obtain the degree of traffic jam at individual links by a statistical process of the probe information gathered from the probe car 4 or via the mobile phone communication network 5, and/or producing various traffic information including the degree of traffic jam at the links and delivering the various traffic information to the probe car 4. The server 20 includes a controller (CPU 21) as an arithmetic device and a control device, and internal storage devices such as a RAM 22 used as a working memory when the CPU 21 performs various arithmetic processes, a ROM 23 that stores various control programs, a program implementing vehicle position information providing method (see, e.g., FIG. 4), and/or the like.

The probe information DB 24 is a storage unit that cumulatively stores the probe information gathered from probe cars 4 running across the nation and the information relating to the current position of each of the probe cars 4 gathered via the mobile phone communication network 5. Note that, in this example, the probe information gathered from the probe cars 4 includes position coordinates (a plurality of which define a travel path) showing a position of the probe car 4. A plurality of such position coordinates for a probe car defines a travel path of the probe car 4.

The traffic information DB 25 is a storage unit that stores probe statistical traffic information generated by the server 20 by performing, for example, a map matching process or a statistical process on the probe information stored in the probe information DB 24. The probe statistical traffic information includes information such as a proceeding direction of the link, a link travel time, the average vehicle speed, the degree of traffic jam at the link, and/or the like.

The map information DB 26 is a storage unit that stores, for example, link data relating to roads (links), node data relating to node points, map display data for displaying a map, intersection data relating to intersections, search data for searching a route, facility data relating to facilities, and/or retrieval data for retrieving a location. The server 20 performs the map matching process of specifying the position of the probe car 4 on a map based on the current position information acquired from the probe car 4 or via the mobile phone communication network 5 and map information stored in the map information DB 26.

The center communication device 27 is a communication device for performing communication with the probe car 4 via the mobile phone communication network 5. The probe center 3 in this example acquires information relating to the current position of the probe car 4 specified in the mobile phone communication network 5 by the center communication device 27.

Figure 3:
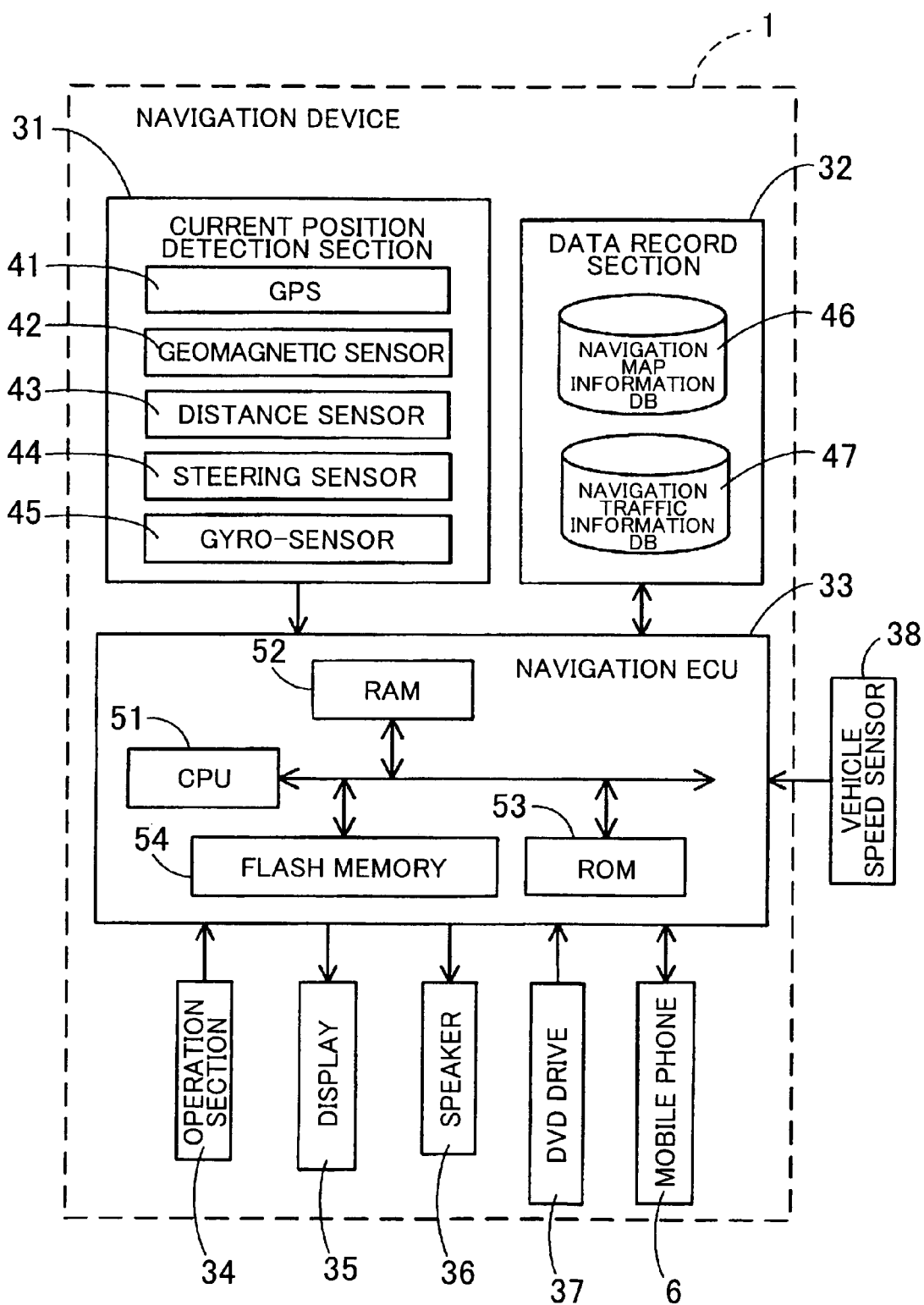
FIG. 3 is a block diagram showing the configuration of an exemplary navigation device.

Next, a schematic configuration of an exemplary navigation device 1 that may be installed in the probe car 4 is described using FIG. 3. As shown in FIG. 3, the navigation device 1 according to this example is formed of a current position detection section 31 that detects the current position of the vehicle, a data record section 32 that stores various data, a navigation ECU 33 that performs various arithmetic processes based on input information, an operation section 34 that accepts an operation from an operator, a display 35 that displays information such as a map to the operator, a speaker 36 that outputs voice guidance relating to route guidance, a DVD drive 37 that reads a DVD serving as a storage medium storing a program, and the mobile phone 6 that performs communication with the probe center 3. The navigation ECU 33 is connected to a vehicle speed sensor 38 that detects the traveling speed of the vehicle.

The current position detection section 31, for example, is formed of a GPS 41, a geomagnetic sensor 42, a distance sensor 43, a steering sensor 44, a gyro-sensor 45 as a direction detection section, an altimeter (not shown) and is capable of detecting the current position of the vehicle, a direction, a distance to an object (for example, an intersection), and/or the like. The GPS 41 is a receiver that receives GPS signals from a GPS satellite, and the navigation ECU 33 acquires a GPS measurement point that specifies the current position of the vehicle based on the GPS signals received by the GPS 41.

The data record section 32 includes a hard disk (not shown) as an external storage device and a storage medium, and a recording head (not shown) as a driver for reading a navigation map information DB 46, a navigation traffic information DB 47, a predetermined program, and/or the like recorded in a hard disk and for writing predetermined data on the hard disk.

The navigation map information DB 46 basically has the same configuration as that of the map information DB 26 of the probe center 3, and stores, for example, link data relating to roads (links), node data relating to node points, map display data for displaying a map, intersection data relating to intersections, search data for searching a route, facility data relating to facilities, and/or retrieval data for retrieving a location.

The navigation traffic information DB 47 stores the probe statistical traffic information delivered from the probe center 3 and Vehicle Information and Communication System (VICS®) information delivered from a VICS center. The navigation ECU 33 performs route search and traffic information guidance using the traffic information stored in the navigation traffic information DB 47.

The navigation electronic control unit (ECU) 33 is an electronic control unit that performs an overall control of the navigation device 1 such as setting a guidance route to the destination from the current position when the destination is selected, comparing the current position of the vehicle acquired by the current position detection section 31 and the current position of the vehicle acquired via the mobile phone communication network 5 through the mobile phone 6, and transmitting, as the probe information, the current position of the vehicle acquired by the GPS 41 to the probe center 3 in the case where the positions do not coincide. The navigation ECU 33 includes a controller (CPU 51) as an arithmetic device and a control device, internal storage devices such as a RAM 52 that is used as a working memory when the CPU 51 performs various arithmetic processes and stores route data and the like of the searched route, a ROM 53 in which a control program, a program implementing a vehicle position information providing method (see, e.g., FIG. 4) and the like are recorded, and a flash memory 54 in which a program read from the ROM 53 is recorded, and.

Next, an exemplary vehicle position information providing method will be described with reference to FIG. 4. The exemplary method may be implemented, for example, by one or more components of the above-described system 2. For example, the method may be implemented by a program that executed at predetermined intervals and is stored in the RAM, ROM, or the like included in the navigation ECU 33 or the server 20, and is executed by the CPU 51 or the CPU 21. However, even though the exemplary structure of the above-described system 2 may be referenced in the description, it should be appreciated that the structure is exemplary and the exemplary method need not be limited by any of the above-described exemplary structure.

Figure 4:
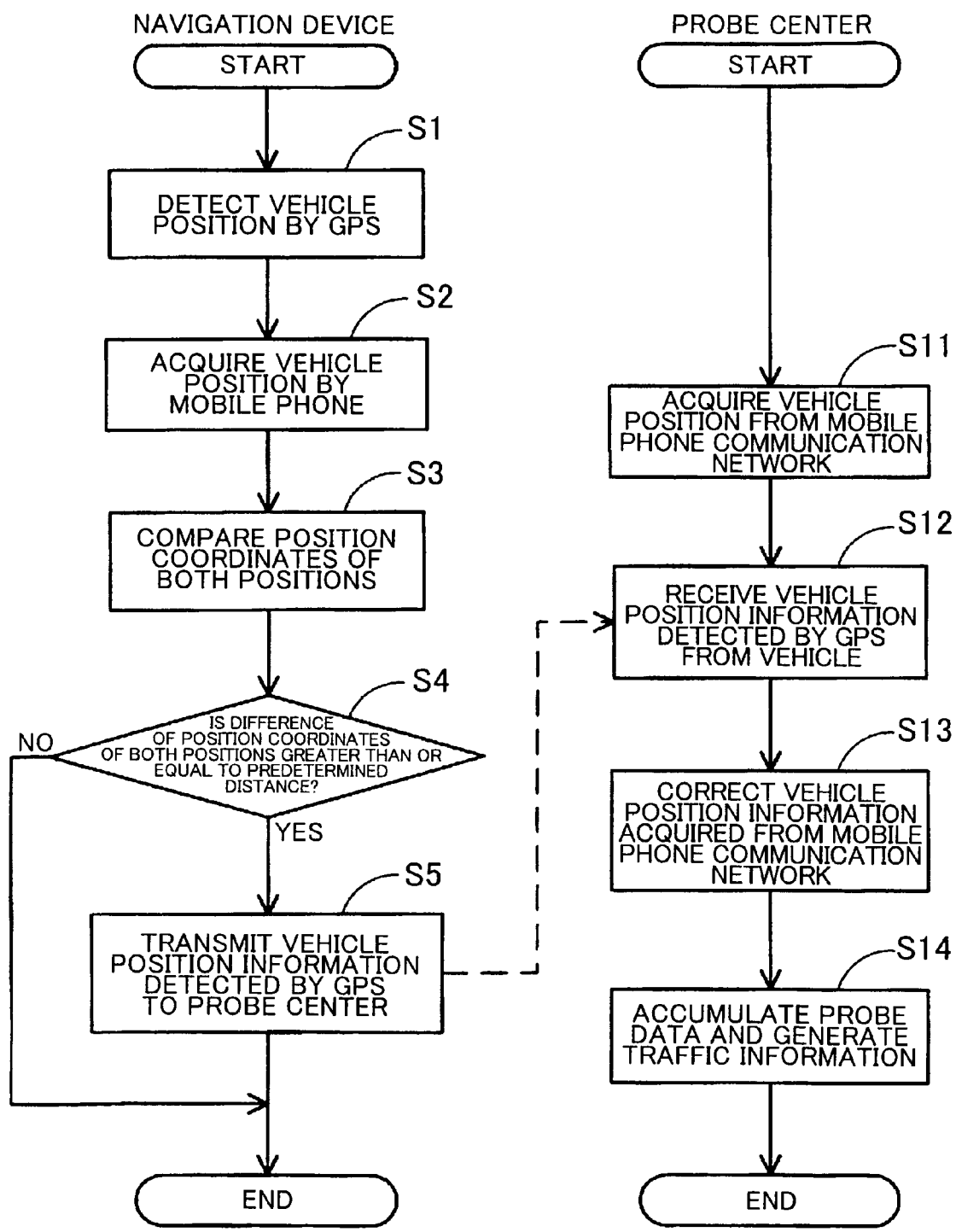
FIG. 4 is a flowchart showing an exemplary vehicle position information providing method.

As shown in FIG. 4, in step (hereinafter abbreviated as "S") 1, the GPS 41 receives GPS signals from the GPS satellite, whereby the CPU 51 detects the current position of the vehicle. The current time is also detected. Note that the acquired current position of the vehicle in this case is a GPS measurement point (latitude and longitude).

Next, the CPU 51 acquires the current position of the vehicle specified by the mobile phone communication network 5 via the mobile phone 6 in S2. Note that, the current position of the vehicle via the mobile phone communication network 5 may be specified by the E-OTD method, the TDOA method, the cell-ID method, and/or the like.

Then, in S3, the CPU 51 compares the position coordinates of the current position of the vehicle detected by the GPS 41 and the current position of the vehicle acquired via the mobile phone communication network 5. Here, because the position of the probe car 4 specified in the mobile phone communication network 5 is less accurate compared to the position of the probe car 4 specified by the GPS 41, it is rare that the position specified by the GPS 41 will match the position specified by the phone communication network 5.

In S4, based on the comparison, the CPU 51 determines whether a difference between the current position of the vehicle detected by the GPS 41 and the current position of the vehicle acquired via the mobile phone communication network 5 is greater than or equal to a predetermined distance. When the difference of the coordinates is not greater than or equal to the predetermined distance (S4: NO), the method ends without transmitting the information relating to the current position of the vehicle detected by the GPS 41 to the probe center 3.

When the difference of the coordinates is greater than or equal to the predetermined distance (S4: YES), the method proceeds to S5. In S5, the information relating to the current position of the vehicle detected by the GPS 41 and the time at which the current position has been detected are transmitted as the probe information to the probe center 3 via the mobile phone 6. According to this example, the information relating to the current position of the vehicle transmitted to the probe center 3 may be a link number of a link in which the vehicle is located, specified by performing a map matching, or may be position coordinates corrected by the map matching process, instead of the position coordinates (x, y) specifying the current position of the vehicle. Further, the speed of the vehicle or the proceeding direction, for example, may also be transmitted together with the position.

With respect to the probe center 3, in S11, the CPU 21 acquires the position information, specified in the mobile phone communication network 5, of probe cars 4 running across the nation from the mobile phone center 8 via the center communication device 27. The time corresponding to the position of each of the probe cars 4 (i.e., the time at which the vehicle has passed the position) is also acquired. Note that the position information of the probe car 4 to be acquired may be position information in real time or position information of a predetermined period in the past.

Next, in S12, the CPU 21 receives the information relating to the current position of the probe car 4 based on the GPS 41 and transmitted from the probe car 4 in S5. Then, in S13, the CPU 21 corrects the position information of the probe car 4 acquired via the mobile phone communication network 5 in S11, based on the GPS position information received from the probe car 4.

Figure 5:
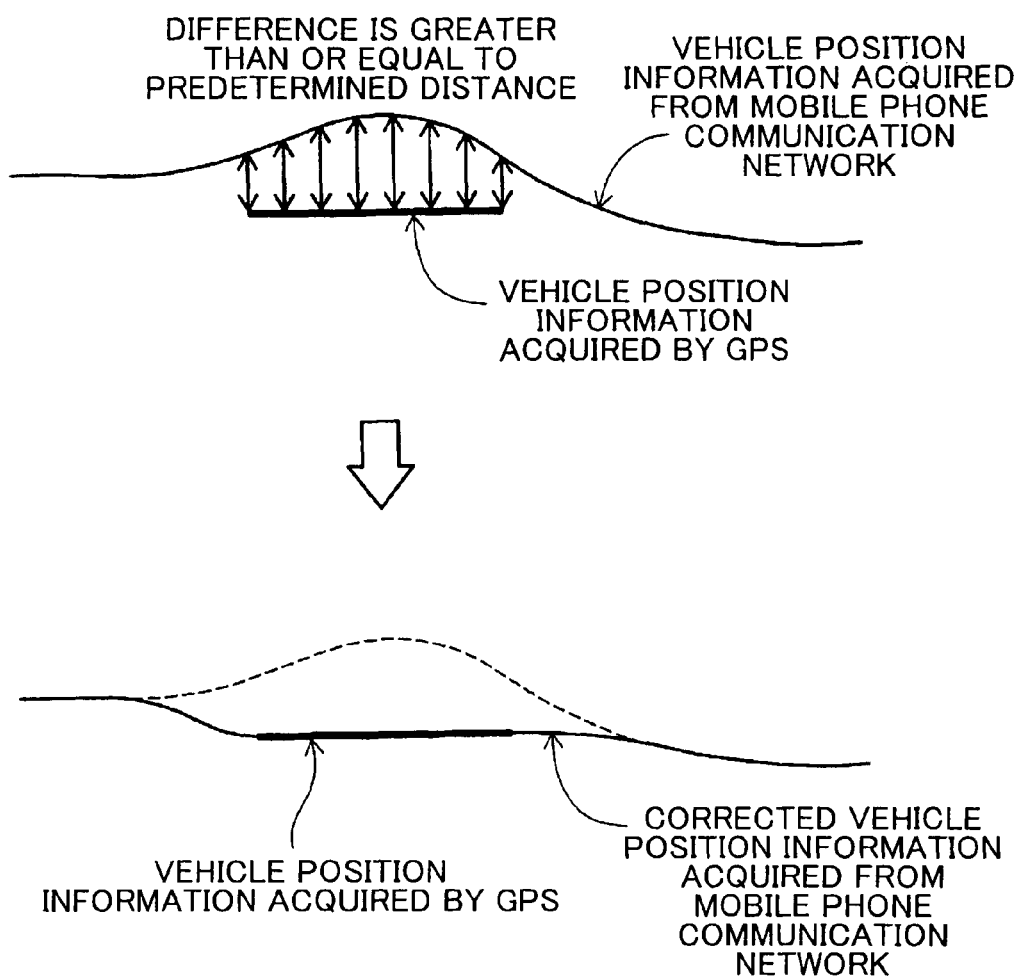
FIG. 5 is a diagram illustrating an exemplary position information correction process.

An example of the correction process of the position information in S13 is specifically described below using FIG. 5. As discussed above, and shown in FIG. 5, the probe center 3 has two kinds of position information, the position information of the probe car 4 acquired via the mobile phone communication network 5 and the position information of the probe car 4 based on the GPS 41 and received from the probe car 4. As described above, because the position of the probe car 4 specified in the mobile phone communication network 5 is less accurate compared to the position of the probe car 4 specified by the GPS 41, a difference frequently occurs between the respective position coordinates of the two kinds of position information. The position information of the probe car 4 based on the GPS 41 is transmitted from the probe car 4 when the navigation device 1 determines such difference to be greater than or equal to the predetermined distance. Therefore, the position information of the probe car 4 based on the GPS 41 is acquired on the probe center 3 side only for the portions of the travel path of the probe car 4 in which the difference exceeds the predetermined difference.

Because the position of the probe car 4 specified by the GPS 41 is more accurate than the position of the probe car 4 specified in the mobile phone communication network 5, more accurate position information of the vehicle can be obtained by correcting the position information of the probe car 4 acquired via the mobile phone communication network 5 based on the position information of the probe car 4 based on the GPS 41, which may be available only for limited regions. Therefore, in the process of S13, the position information of the probe car 4 acquired via the mobile phone communication network 5 is corrected such that the travel path of the probe car 4 based on the GPS 41 becomes continuous with the travel path of the vehicle based on the mobile phone communication network 5, as shown in FIG. 5.

Returning to FIG. 4, in S14, the CPU 21 stores the position information of the probe car 4 based on the GPS 41 and transmitted from the probe car 4 and the position information of the probe car 4 acquired via the mobile phone communication network 5 and corrected in S13 in the probe information DB 24 as the probe information. The CPU 21 then performs the map matching process with respect to the stored probe information at predetermined intervals (for example, 5 minutes, 24 hours, and 1 year), and generates the traffic information such as the degree of traffic jam by performing the statistical process using the result of the matching. Note that the generated traffic information is delivered to the probe car 4, whereby the navigation device 1 installed in the probe car 4 can perform guidance of the delivered traffic information and set a guidance route depending on the degree of traffic jam.

As described above in detail, in the navigation device 1, the vehicle position information providing method, and the computer program executed by the navigation device 1 to implement the method, the current position of the probe car 4 is detected by the current position detection section 31 installed in the probe car 4 (S1), and the current position of the probe car 4 is similarly acquired via the mobile phone communication network 5 through the mobile phone 6 (S2). When the position coordinates of both positions are compared (S3), and the difference of both position coordinates is greater than or equal to the predetermined distance (S4), the information relating to the current position of the probe car 4 specified by the GPS 41 is transmitted to the probe center 3 (S5). Therefore, in the case where the position information of the vehicle via the mobile phone communication network has an accuracy within a certain acceptance range, utilizing the position information on the probe center 3 side reduces the number of times communication between the navigation device 1 and probe center 3 is required and reduces the amount of communication data sent to the probe center 3, while maintaining the accuracy of the position information of the probe car 4 supplied to the probe center 3 from the probe car 4. Accordingly, the reduction of communication processing load and communication fees can be achieved.

Because the probe car 4 and the probe center 3 can acquire the information relating to the current position of the probe car 4 by utilizing the mobile phone communication network 5, the current position of the probe car 4 can easily be provided to the probe car 4 and the probe center 3 while keeping the communication fees low. The current position of the vehicle can also be acquired without performing data communication through the mobile phone 6 particularly on the probe car 4 side.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, although the information relating to the current position of the vehicle acquired by the GPS 41 is transmitted to the probe center 3 when the difference of the position coordinates of the current position of the vehicle acquired by the GPS 41 in the navigation device 1 and the current position of the vehicle acquired via the mobile phone communication network 5 is greater than or equal to the predetermined distance (S4: YES), the information may be transmitted when the position coordinates of the current position of the vehicle acquired by the GPS 41 and the current position of the vehicle acquired via the mobile phone communication network 5 do not coincide. Further, the predetermined distance may be formed to be changeable by the navigation device 1 and the probe center 3.

Although the position coordinates of the current position of the vehicle acquired by the GPS 41 in the navigation device 1 and the current position of the vehicle acquired via the mobile phone communication network 5 are compared (S3), the position coordinates of a predetermined period in the past instead of those in real time may be compared instead.

What is claimed is:

1. A vehicle position information providing device, comprising:
   a communication device that communicates over a mobile phone network;
   a controller that:
      acquires a first current position of a vehicle based on a radio signal received from a GPS satellite;
      acquires a second current position of the vehicle based on a current position measured by the mobile phone network and received by the communication device, the current position measured by the mobile phone network being measured without using a radio signal received from a GPS satellite;
      determines whether the first current position and the second current position coincide;
      if the first current position and the second current position do not coincide, causes the communication device to transmit information relating to the first current position and the time at which the first current position was detected to an information center; and
      if the first current position and the second current position coincide, prevents the communication device from transmitting information relating to the first current position and the time at which the first current position was detected to an information center.

2. The vehicle position information providing device according to claim 1, wherein the controller:
   determines whether the second current position differs from the first current position by greater than or equal to a predetermined distance; and
   only causes the communication device to transmit the information relating to the first current position and the time at which the first current position was detected to the information center when the second current position differs from the first current position by greater than or equal to the predetermined distance.

3. A navigation device comprising the vehicle position information providing device according to claim 1.

4. The navigation device of claim 3, wherein:
   the communication device receives traffic information from the information center, the traffic information generated based on the transmitted information relating to the first current position.

5. The navigation device of claim 4, wherein the controller:
   receives an input destination;
   searches for a route to the destination based on the received traffic information; and
   causes the route to be displayed on a display.

6. A vehicle position information providing method, comprising:
   acquiring a first current position of a vehicle based on a radio signal received from a GPS satellite;
   acquiring a second current position of the vehicle based on a current position measured by a mobile phone network and received by a communication device that communicates over the mobile phone network, the current position measured by the mobile phone network being measured without using a radio signal received from a GPS satellite;
   determining whether the first current position and the second current position coincide; and
   if the first current position and the second current position do not coincide, causing the communication device to transmit information relating to the first current position and the time at which the first current position was detected to an information center; and
   if the first current position and the second current position coincide, preventing the communication device from transmitting information relating to the first current position and the time at which the first current position was detected to an information center.

7. The vehicle position information providing method according to claim 6, further comprising:
   determining whether the second current position differs from the first current position by greater than or equal to a predetermined distance; and
   only causing the communication device to transmit the information relating to the first current position and the time at which the first current position was detected to the information center when the second current position differs from the first current position by greater than or equal to the predetermined distance.

8. A computer-readable storage medium storing a computer-executable program usable to provide vehicle information, the program comprising instructions that cause a computer to:
   acquiring a first current position of a vehicle based on a radio signal received from a GPS satellite;
   acquire a second current position of the vehicle based on a current position measured by a mobile phone network and received by a communication device that communicates over the mobile phone network, the current being measured without using a radio signal received from a GPS satellite;
   determine whether the first current position and the second current position coincide;
   if the first current position and the second current position do not coincide, cause the communication device to transmit information relating to the first current position and the time at which the first current position was detected to an information center; and
   if the first current position and the second current position coincide, prevent the communication device from transmitting information relating to the first current position and the time at which the first current position was detected to an information center.

9. The computer-readable storage medium according to claim 8, wherein the program further comprises instructions that cause a computer to:
   determine whether the second current position differs from the first current position by greater than or equal to a predetermined distance; and
   only cause the communication device to transmit the information relating to the first current position and the time at which the first current position was detected to the information center when the second current position differs from the first current position by greater than or equal to the predetermined distance.

* * * * *